United States Patent

Pontigny

[15] 3,700,992

[45] Oct. 24, 1972

[54] CURVE TRACER

[72] Inventor: Jacques A. Pontigny, Montmorency, France

[73] Assignee: Coulter Electronics, Inc., Hialeah, Fla.

[22] Filed: July 26, 1971

[21] Appl. No.: 165,472

[52] U.S. Cl. .................. 318/568, 318/577, 340/182
[51] Int. Cl. ................................. G05b 19/42
[58] Field of Search ....... 318/577, 568, 640; 340/182

[56] References Cited

UNITED STATES PATENTS

| | | | |
|---|---|---|---|
| 2,907,997 | 10/1959 | Corwin et al. | 318/568 X |
| 3,366,934 | 1/1968 | Kelsey | 318/568 X |
| 3,391,392 | 7/1968 | Doyle | 318/568 X |
| 3,441,922 | 4/1969 | Thompson | 340/182 |

Primary Examiner—Benjamin Dobeck
Attorney—I. Irving Silverman et al.

[57] ABSTRACT

A curve tracer of two variables respectively represented on axes of variables Y and X on a recording rack, capable of being removed at a speed depending upon the first of the said variables, said tracer comprising a first regulation loop having a first movable organ, the removal of which is regulated by the variations of the second of the said variables, a second regulation loop having a second movable organ, allowing to trace a curve on the said recording rack, a scale transformation device, mechanically coupled with the first said movable organ and having a second recording rack on which is traced a scale transformation curve representing for each value to be transformed of the second variable, represented on the axis of X, a transformed value represented on the axis of Y, and detector means mounted in the second said regulation loop and adapted so as to be able to move along the axis of Y of the curve of the said second recording rack, the movement of the second movable organ being regulated by the movement of the detector means.

14 Claims, 9 Drawing Figures

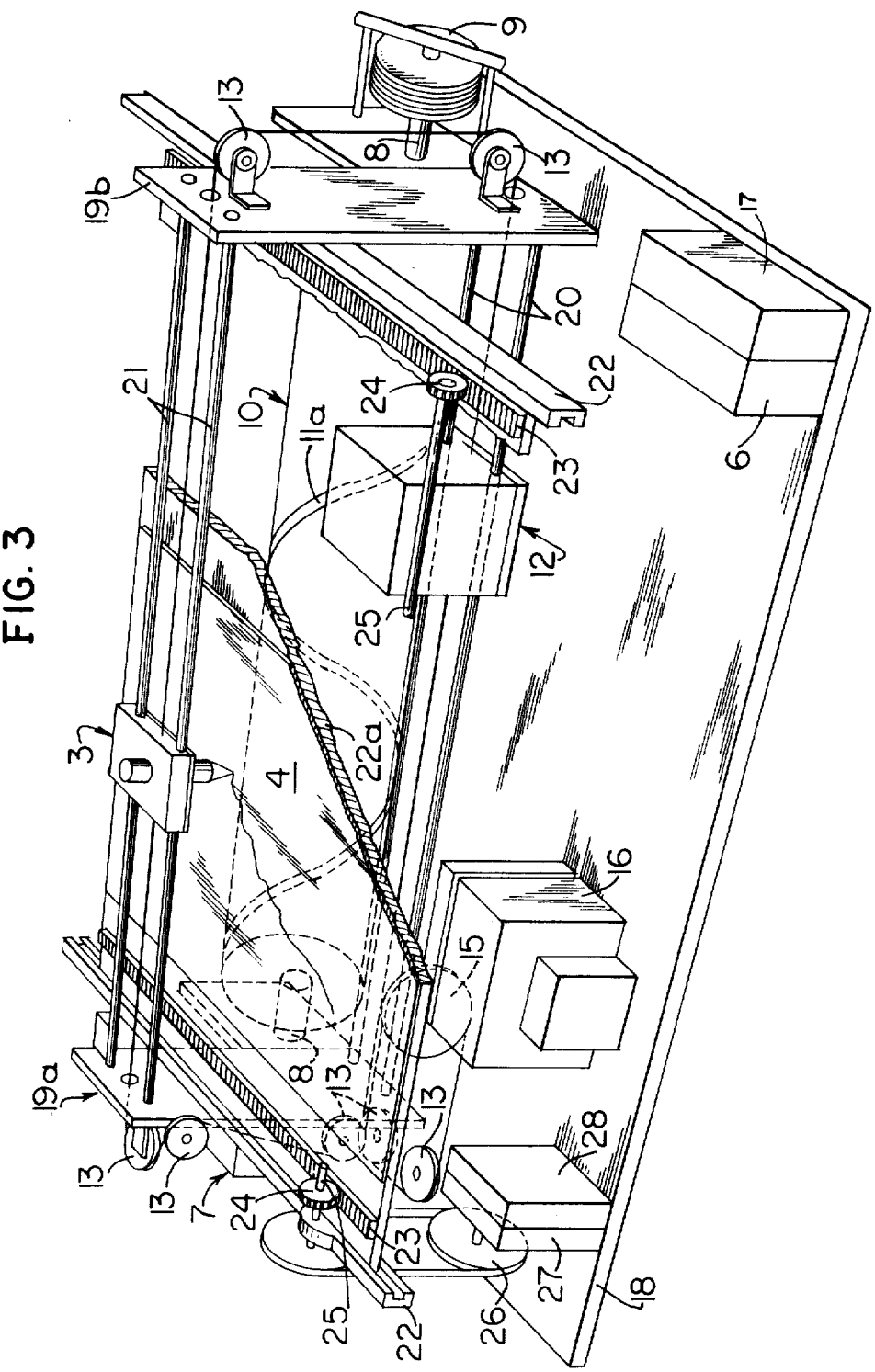

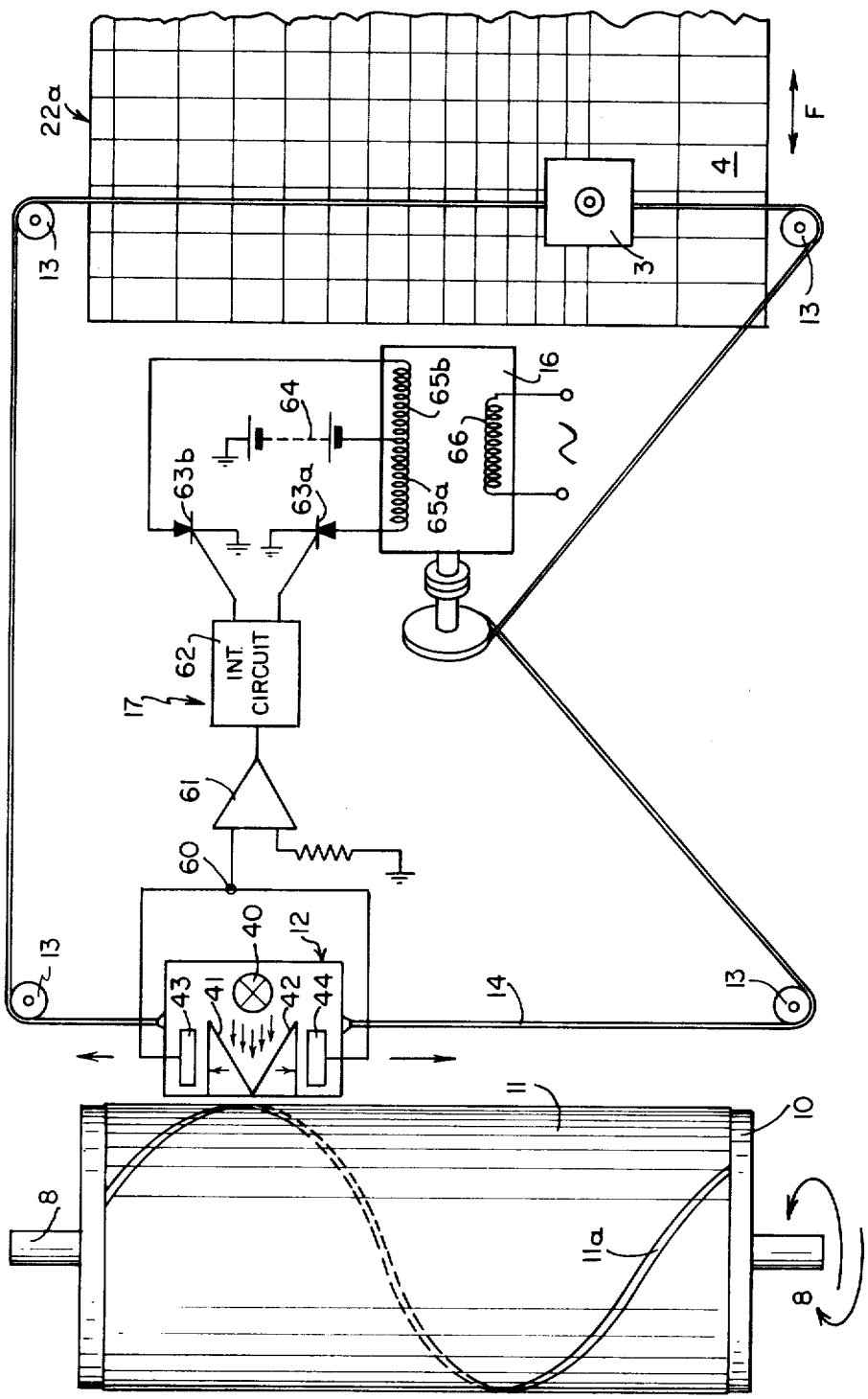

PATENTED OCT 24 1972

CURVE TRACER

FIELD OF THE INVENTION

This invention relates to Curve tracing Machines.

The known machines of this type show curves — on plotting paper, for instance — with well determined axes Y and X depending upon the nature of the phenomenon to be recorded. Thus, we know machines for tracing curves with logarithmic, linear, differential scales or others.

Most of these machines have a setting loop the electrically variable element of which is a potentiometer, the slider of which determines the movement of the tracer stylus, i.e., of one of the scales of the paper, as a function of the size to be recorded on the latter. The other variable is, generally, the speed of the paper.

The potentiometer which is generally of the coil type must consequently be coiled so that its resistance variation corresponds to the scale utilized on the paper. For linear or logarithmic scales, we are — at present — able to manufacture potentiometers the coiling of which is very precise, to respond to the total precision of a given tracer.

Contrarywise, in some cases, a graph can only be usefully interpreted if it, comprises at least one particular scale, for instance, a differential scale or a so called "probability"scale made out according to Poisson's distribution. Now, for these cases, it is very difficult and costly to manufacture precise potentiometers since their coiling must be accomplished as a function of the scale to be shown. Consequently, the tracing of these graphs is generally made by hand. This is the case, for instance, when we show the distribution of a bacteria population (Histogram). In this case, a scale of volume or diameter of the bacterium is indicated on the axis of X and differential numbers corresponding to the classes of counted particles on the axis of Y.

Such a graph can also contain on the axis of Y, a cumulative scale, and in this case, it represents the integral of the function number/dimension of the analyzed sample of bacteria. In other analyses it can be useful to use logarithmic scales, linear/logarithmic, linear/"probability scales ... etc.

It is an object of the invention to provide a curve tracer which avoids the use of particular coiled potentiometers, while being capable of tracing graphs having — on the axis of Y — a scale which is strictly left to the user's choice.

The curve tracer, according to the invention, for the recording of two variables respectively represented on a recording rack, on an axis of Y and axis of X, is characterized by the fact that it comprises means to move the recording rack with a speed which depends upon the first of the said variables, a first regulation loop including a first movable organ, the movement of which is regulated by the variations of the second of the said variables, a second regulation loop comprising a second movable organ allowing the tracing of a curve on the said recording rack, a scale transformation device, mechanicallY coupled with the first said movable organ, and including a second recording rack on which a transformation scale curve is traced, representing — for each value to be transformed of the second variable on the axes of X a value on the axes of Y, and detecting means mounted in the second regulation loop and adapted to be capable of sliding along the axes of Y of the curve of the recording rack, the movements of the second movable organ being regulated by the movements of the said detecting means.

The first movable organ the movements of which depend upon the variations of one of the variables can be a linear potentiometer, available on the market, the slider of which is directly coupled to the scale transformation device.

The latter is, by preference, a rotative cylinder mounted on a shaft which is coupled with the slider of the linear potentiometer. The cylinder holds a removable recording rack on which is previously traced a transformation curve which can be "read out" by a detector, photo-electrical by preference. Other characteristics of the invention will appear in the following description.

SUMMARY OF THE INVENTION

A curve tracer comprising a first recording rack for curves having two variables on axes of X and Y, the tracer including a first regulation loop, having a first movable organ, a second regulation loop having a second movable organ, a scale transformation device associated with the first movable organ and having a second recording rack for tracing a scale transformation curve, and detector means regulating the movement of the second movable organ.

In the drawings:

FIGS. 1A and 1B respectively show graphs of a distribution of masses in a sample of particles suspended in a liquid, the graph being traced with a logarithmic scale on the axis of Y (FIG. 1A) and a scale "of probability" (FIG. 1B).

FIG. 3 shows a schematic perspective view of the tracer.

FIG. 5 shows a scheme of a scale transformation loop of the tracer.

DESCRIPTION OF THE PREFERRED EMBODIMENTS

Figure 1A:
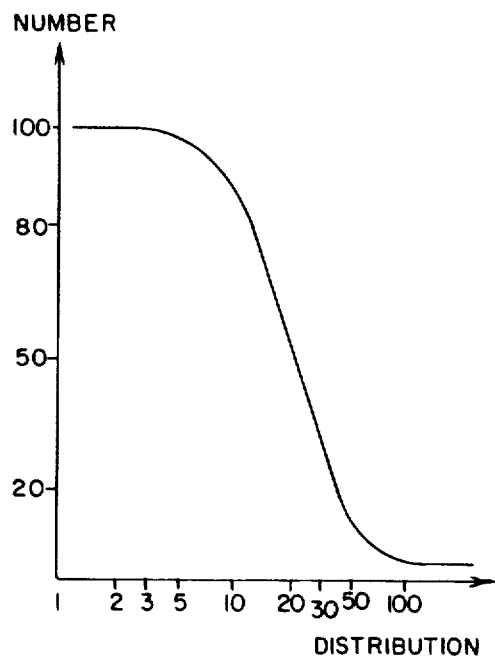
Figure 1B:
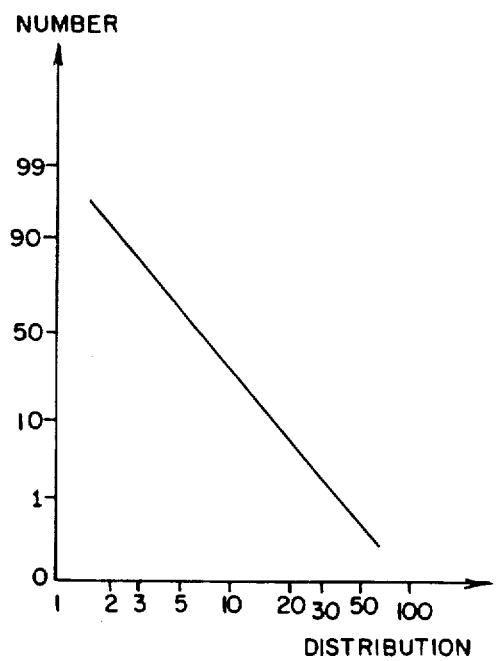

FIGS. 1A and 1B show applications of the curve tracing machine, according to the invention.

As an example, if the tracer of the invention is used for analysis of industrial products such as dusts, granulated sediments, etc . . . the gamut of sizes which the analyzer is generally interested in, between the finest and the biggest particles, varies in volume by several thousands and even tens of thousands. To obtain a graphical representation of the volume or mass distribution of such a sample, instead of using linear scale axes, logarithmic axes or others should be considered. Mostly, in the case of a volume assessment in percentage, it is advantageous to use a scale designated as "of probability" derived from Poisson's distribution. FIG.

1A, represents a graph showing — by means of a logarithmic scale axis — the volume distribution of particles of an arbitrarily chosen sediment sample. It is obvious that — even with a logarithmic scale — the curve cannot be properly read out, values on the Y axis being very close on both the extremities of the curve. This can be remedied by using — for the Y axis — a different scale — Poisson's scale — "of probability" which allows the "spreading" of the curve so as to practically get a straight line the reading of which is very easy.

It is to be noted that this example was chosen only to illustrate the invention. The curve tracer according to the invention allows graphs with any type of scales, as will become apparent in this description.

Figure 2:
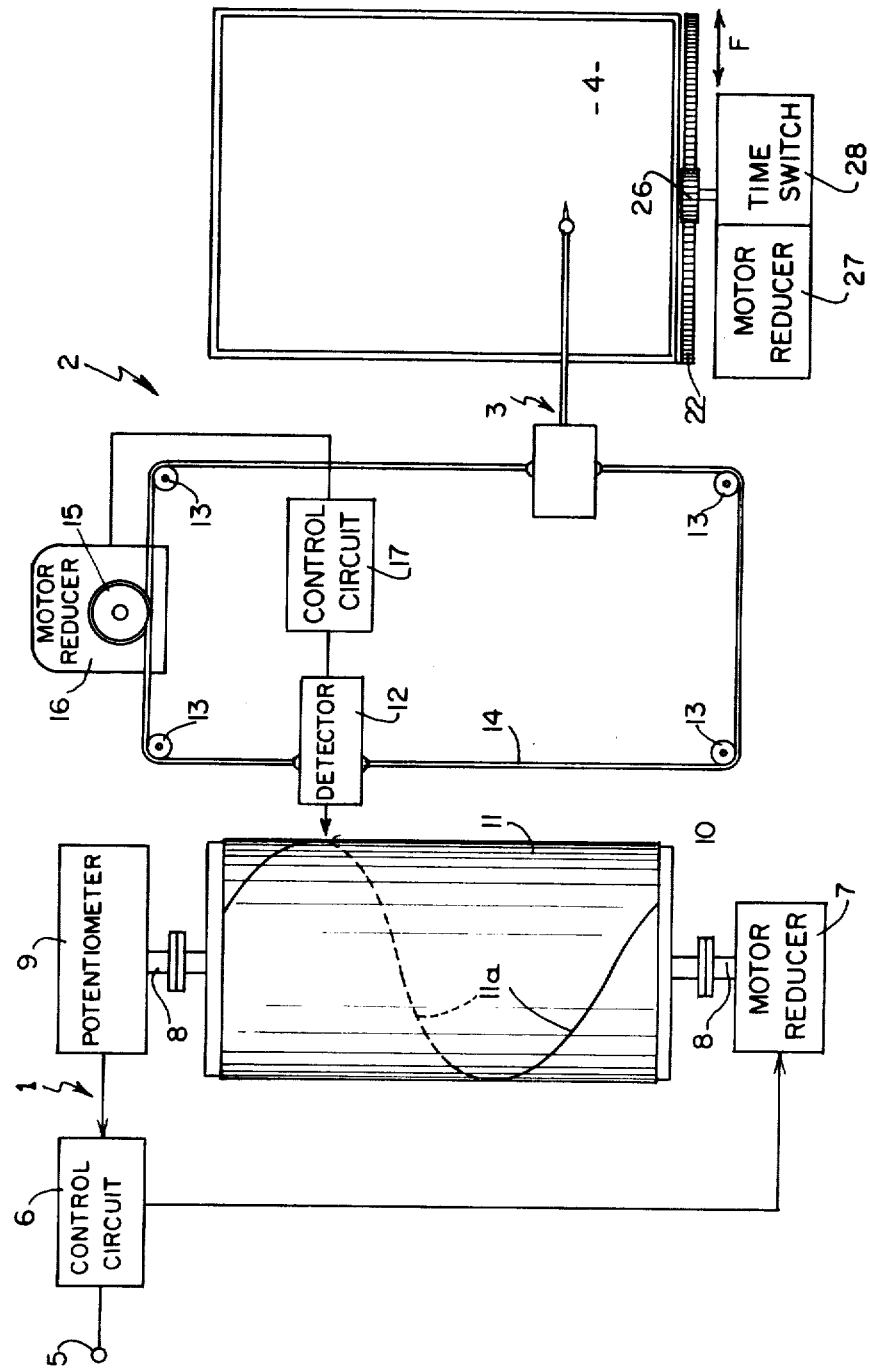
FIG. 2 is a synoptical scheme of a curve tracer, according to the invention.

As is seen in FIGS. 2 and 3, the curve tracer according to the invention comprises regulation loops 1 and 2 — the first being called "analysis loop" and the second "scale transformation loop." The latter controls a stylus 3 which passes upon a plotting paper 4 — movable in the direction of the arrow F.

The analysis loop 1 is of the open type, and comprises an input 5 to which are applied signals the values thereof are to be represented on the Y-axis on the plotting paper 4. This input 5 is connected to a control circuit 6 of a driving motor-reducer 7 the output shaft 8 of which drives the slider of a coiled linear potentiometer 9 of the toroid winding type, which is available on the market.

The latter is also connected to the control circuit 6 by closing the analysis loop 1. The transformation scale loop 2 is constructed as follows. A cylinder 10, fixedly mounted to the output shaft 8 of the driving motor-reducer 7 comprises an outline 11 on its cylindrical external face, for instance a stressed line the shape of which represents the scale transformation curve. This cylinder can be obtained from a portion of a tube provided with fastening means on the paper on which the transformation curve 11 is traced. This curve can easily be obtained once and for all by computing — for determined values of the scale to be transformed — corresponding values of the scale to be obtained. The initial values are then marked on the X-axis on a sheet of paper while the calculated values are marked on the Y-axis. Then, the paper is mounted on the cylinder so that the X-axis forms a circle of the cylinder and the Y-axis a generatrix thereof.

A photo-electrical detector 12, in the described example, can move laterally, thus, on a parallel to the shaft of cylinder 10 by means of a set of pulleys 13 and a cable 14 which is wound around an output pulley 15 of a motor-reducer 16. The latter is controlled by a control-circuit 17 which in itself is connected to the detector 12 to close the transformation loop. The cable 14 is integral with the stylus 3.

In FIG. 3, it is seen that the tracer unit is mounted on a plate 18 on which two spaced apart supports 19a and 19b are fixed. The cylinder 10 is mounted between both the supports on the shaft 8 of the motor-reducer 7 which extends along the whole length of the plate 18 and is connected to the potentiometer slider.

Two pairs of rods 20 and 21 allow — on one hand — the sliding of the photo-electric detector 12 and, on the other, the sliding of the stylus 3. Two rails 22 are respectively connected to the supports 19a and 19b and act as slide-bars for a paper-holder plate 22a which, thus, can move along in front of the stylus 3. The plate includes on each side a rack 23 meshing with two pinions 24 which are integral with a shaft 25. The latter is put in rotation by a pulley 26 which is coupled to the output shaft of a driving motor-reducer 27. The latter is controlled by a time switch 28, as will be explained hereinafter.

Figure 4:
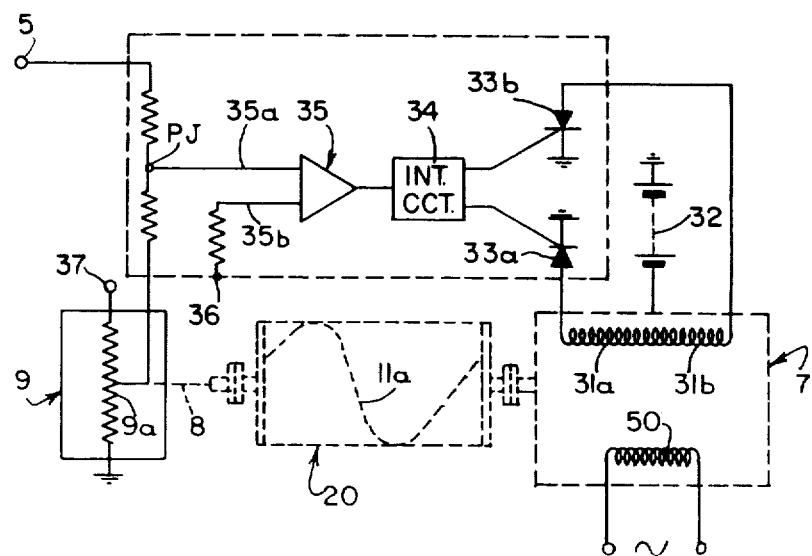
FIG. 4 is a scheme of an analysis loop used in the tracer of the FIGS. 2 and 3.

FIG. 4 shows the analysis loop in greater detail. The motor-reducer 7 comprises a main winding 30 fed with alternative current, and two control windings 31a and 31b connected in opposition and allowing to control both directions of rotation of the motor.

Both control windings 31a and 31b are fed by a continuous current source 32 by means of two thyristors 33a and 33b, respectively. The control electrodes of the thyristors are connected to an intermediary circuit 34, details of which will be described below. This circuit is preceded by an operational amplifier 35 receiving on its input 35a a summation signal derived from comparing the signal to be analyzed applied to the input 5 and the signal coming from the potentiometer 9. In other words, the input 35a receives the regulation loop variation signal. The second input 35b of the operational amplifier 35 is connected to a source designated 36.

The potentiometer 9 is connected between the ground and a power source 37. Its slider 9a is electrically connected to the input 35a of the amplifier 35 and mechanically to the output shaft of the motor-reducer 7.

Referring to FIGS. 3 and 5, it is readily seen that the scale transformation loop 2 includes the detector 12 which is mounted so as to be capable of moving on a line which is parallel to the cylinder 10 axis. The latter acts as a coupling organ as will become apparent hereinafter.

The detector 12 comprises a light source 40, for instance, in the present embodiment, an incandescent lamp, two prisms 41 and 42 which respectively cooperate with two photo-resistant cells 43 and 44. It is obvious that these components can be replaced by any element capable of supplying from a variable luminous flux, an electrical signal varying in accordance therewith.

The light source 40 lights the cylinder surface 10 through the prisms; each of the photo-resistant cells 43 and 44 receives the luminous flux which is reflected by the cylinder surface portion lighted by the corresponding prism. The curve 11a which is recorded on this surface by a black stressed line, for instance, can, thus, modify the intensity of the luminous flux which hits the corresponding cell depending upon whether the line is or is not in front of the corresponding prism. The general arrangement is such that the items of electrical information transmitted by the photo-resistant cells 43 and 44 are identical, when they receive through the prisms the same luminous energy, i.e., when the zone determined by the portion of stressed line located in front of the prisms is also divided between those prisms. It is to be noted— that in the interest of clarity of the drawing — the detector 12 has been shown in a position which is angularly displaced by 90° relative to its actual position as will be seen in FIGS. 6 and 7.

Figure 6:
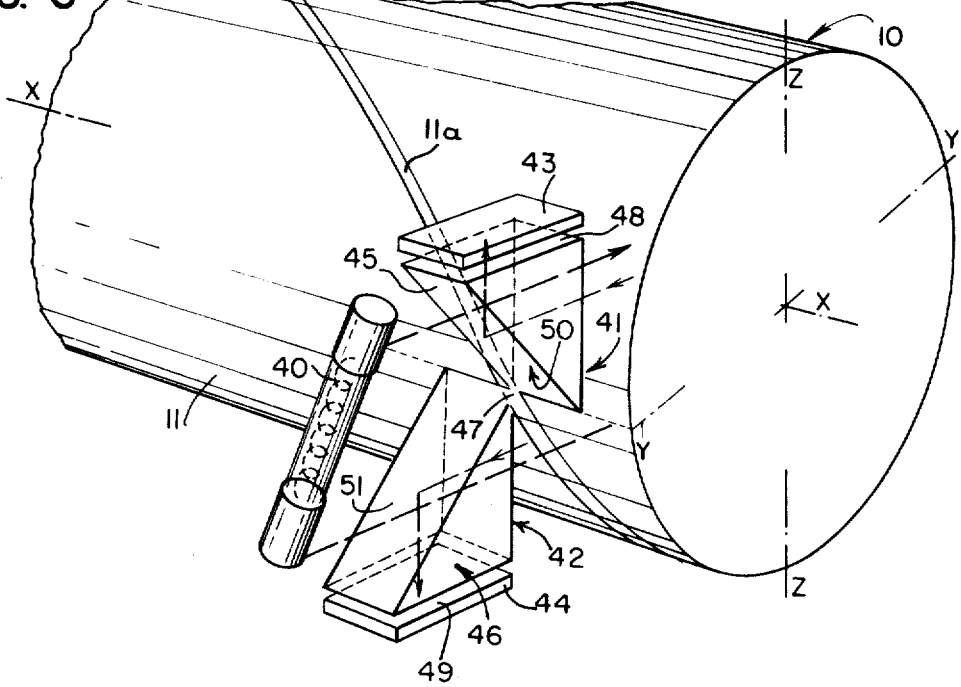
FIG. 6 represents in perspective, a scheme of a photoelectric detector used in the transformation loop of FIG. 5.

In FIG. 6, which represents a first embodiment of the detector 12, two regular prisms 41 and 42, of a triangular cross section are shown. These right angled sections, are perpendicular to the axis X—X of the cylinder 10. The rectangular faces forming each prism's dihedral rectangle are parallel to the planes X—Y and X-Z, respectively, those planes being in FIG. 6 the vertical and horizontal planes. The prisms are displaced so that the triangular section 45 of one 41 of them is in the plane of the opposed section 46 of the other prism 42. Thus, two edges of prisms are on the same line one after the other at 47 and in the plane X-Y of the cylinder, near the corresponding generatrix.

The prism faces 48 and 49 are contiguous to the photoresistant cells 43 and 44. The luminous source 40 is, preferably, constituted by a cylindrical bulb obliquely placed near the inclined faces 50 and 51 of the prisms.

Figure 7:
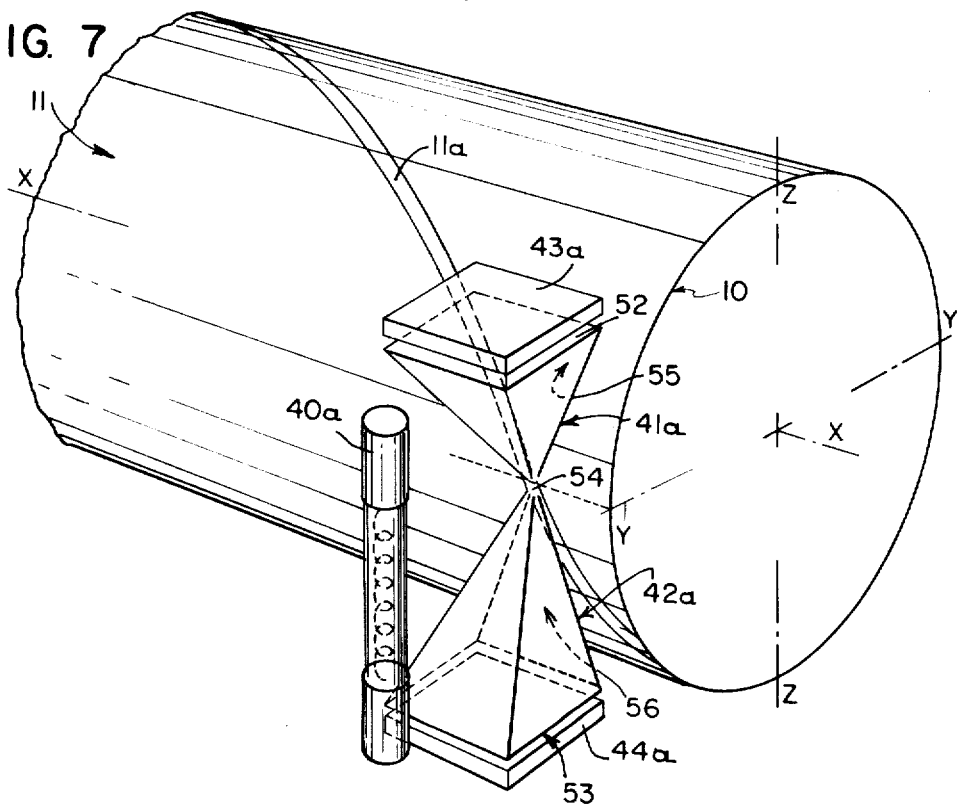
FIG. 7 shows another embodiment of the photoelectric detector of the transformation loop.

FIG. 7 shows in a perspective view another embodiment of the detector 12. In this case, prisms 41a and 42a are rectangular based pyramids. The bases 52 and 53, respectively, are parallel to the plane X-Y, the axes X, Y and Z being the same as in FIG. 6.

The tops of the pyramids meet at point 54, while the faces 55 and 56 which are in front of the cylinder 10, are perpendicular to the prisms bases, i.e., parallel to the plane X-Z. Photo-resistant cells 43a and 44a are adjacent to bases 52 and 53 of the prisms, while a luminous source 40a — also constituted by a tubular bulb — is directed perpendicular to the plane X-Y.

Again referring to FIG. 5, it is seen that the photoresistant cells 43 and 44 or 43a and 44a are connected to a junction point 60 which in itself is connected to the control circuit 17 (FIG. 2). The latter, which is practically identical with the control circuit 6 of the analysis loop 1 comprises an operational amplifier 61, an intermediary circuit 62 and two thyristors 63a and 63b. These thyristors are respectively connected in series with a voltage source 64 and control windings 65a and 65b of the motor-reducer 16 which includes, like the motor-reducer 7, a main winding 66 fed with alternative current.

Figure 8:
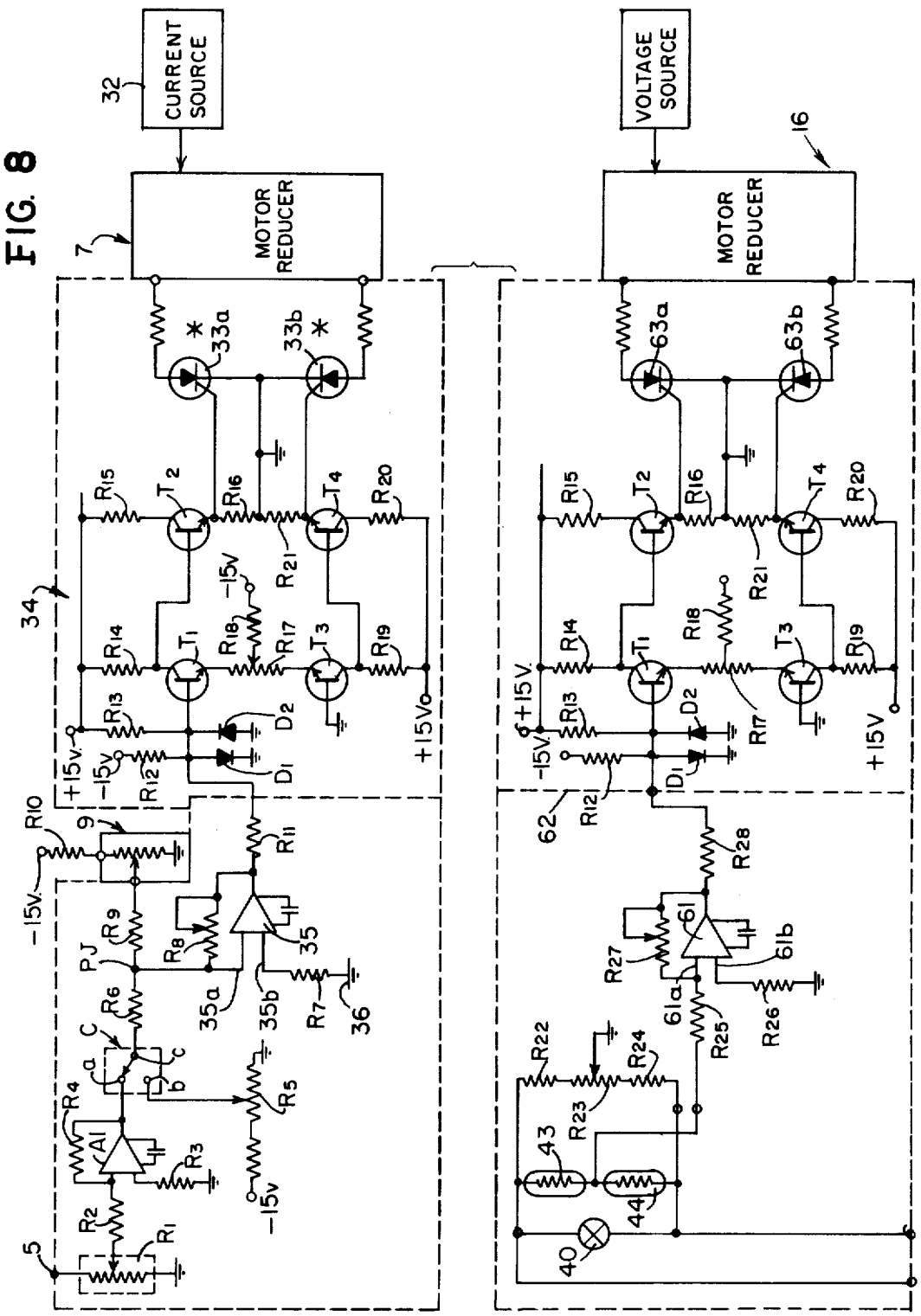
FIG. 8 shows detailed electrical circuits of the analysis and transformation loops.

FIG. 8 shows in detail the electrical circuitry of the curve tracer unit.

The input 5 of the analysis loop 1 is connected to a potentiometer R 1 which regulates the input signal level, its opposite extremity being connected to the ground. Its slider is connected to the first input of an amplifier A 1 through the intermediary of a resistor R 2. The other input of this amplifier A 1 is connected to the ground through the intermediary of a resistor R 3. The amplifier is shunted by a resistor R 4.

The output of the amplifier A 1 is connected to one fixed contact $a$ of a selector switch C, the other fixed contact $b$ thereof being connected to the slider of a calibration potentiometer R 5, connected between a − 15V voltage source and the ground. The movable contact $c$ of the selector switch C is connected to the junction point PJ through a resistor R 6. The junction point is connected to the input 35a of the amplifier 35, see also FIG. 4, the other amplifier input 35b is connected to a reference source 36, constituted by the ground, by way of a resistor 7. The amplifier 35 is also shunted by a rheostat R 8.

The junction point PJ is also connected to the slider of a potentiometer 9 through a resistor R 9, the potentiometer 9 being placed between the ground and a resistor R 10, which is connected to a − 15V power source.

The amplifier 35 output is connected to an intermediary circuit 34 through a resistor R 11.

The intermediary circuit 34 comprises two pairs of transistors respectively T 1, T 2 and T 3, T 4 connected as follows.

The transistor T 1 base is directly connected to the resistor R 11 and to ground through two diodes D 1 and D 2 arranged "top against bottom" and adapted to limit the level of the intermediary circuit input. The base is polarized by a resistor R 12 connected to a − 15V power source, and by a resistor R 13 connected to a + 15V power source. The transistor T 1 collector is connected to that same source through a resistor R 14 and to the transistor T 2 base. The collector-emitter circuit of the latter is connected to a + 15V power source and to the ground, respectively through resistors R 15 and R 16. Also, the transistor T 2 emitter is connected to the control electrode of the thyristor 33a.

The transistor T 1 emitter is connected to the transistor T 3 emitter through a potentiometer R 17. The slider of this potentiometer is connected to a − 15V power source through a resistor R 18.

The transistor T 3 base is connected to the ground while its collector is connected to a + 15V power source through a resistor R 19 and to the transistor T 4 base. The collector-emitter circuit of the latter is connected to that same source through a resistor R 20 and to the ground through a resistor R 21.

The detector 12 comprises the two photoresistances 43 and 44 or 43a and 44a, arranged in series with the terminals of a 5V, 0.8A power source which also feeds the bulb 40 or 40a.

The voltage at the photoresistances is balanced by series arrangement of a resistor R 22, a potentiometer R 23 with a slider connected to the ground and a resistor R 24, the series arrangement being connected to the 5V potential source terminals.

The junction between the photoresistances 43 and 44 is connected to the first input 61a of the amplifier 61 through a resistor R 25, the other input 61b being connected to the ground through a resistor R 26. The amplifier is shunted by a rheostat R 27, its output being connected to an intermediary circuit 62 through a resistor R 28.

The circuit 62 is identical to the circuit 34 and will therefore not be described in detail, the same references being used to show analogous components.

The operation of the tracer is as follows:

Once the axis of Y scale has been chosen, the appropriate transformation curve is placed on the cylinder 10, by means of a suitable device (not shown). To this end a series of appropriate transformation sheets of paper may be used, each of them for a given transformation. The curves of these sheets must thus be traced in advance.

The variable of the X-axis is applied to the input 5. A variation of this variable in regard to the instantaneous position of the potentiometer 9 slider 9a (FIG. 4) provides an input signal to the amplifier 35 which — through the intermediary of the circuit 34 and the thyristors 33a and 33b — produces a current in one or the other of the windings 31a or 31b, depending upon the variation sign. The release of the thyristors is respectively caused by the transistor couples T 1 to T 4.

The input level of amplifier 35 has first been calibrated by means of the potentiometer R 5 and the rheostat R 8.

The motor-reducer 7 will then turn in one or the other direction, causing rotation of the cylinder 10. Assuming the detector 12 is previously opposite to the trace 11, being angularly distant by a certain value regarding the axes system traced on the cylinder, each prism receives the same quantity of light.

In fact, the luminous flux sent by the lamp 40 towards the prisms, goes through those prisms and is reflected by the cylinder surface. In the black zones of the trace 11, the reflected luminous flux is obviously less intense, and so that each prism sends back the same quantity of light towards the corresponding photo-resistance, which conditions the state of balance of the transformation loop, each prism must be in front of a portion of the trace 11, equal to the portion on the other prism. Under these conditions, the potential of the junction point of the photoresistances 43 and 44 i.e., input 61a of the amplifier 61, (FIG. 8) is a value which permits to balance the potential value applied to the input 61b by the resistor R 26.

On the other hand, as soon as the cylinder performs a rotation, caused by a variation of the variable (input 5) through the analysis loop, the transformation loop is disturbed since one of the photoresistances 43 or 44 will receive less light than the other. The transformation loop acts then upon the motor-reducer 17 so that the detector 12 moves along to a position such that the prisms will again receive equal luminous flux.

In the described method, the plate 22a is periodically removed by the motor-reducer 27 which is fed — at regular intervals — by a time switch.

This control can be synchronized with the application of the value of the variable to be transformed, at the input 5 so that the transformation only occurs at regular intervals. However, it is possible to foresee a continuous removal of the plate 22a, the variable being directly applied to the input 5.

It is believed apparent that considerable variations and substitutions of equivalents are capable of being made without in any way departing from the spirit and scope of the invention as defined in the appended claims.

What it is desired to secure by Letters Patent of the United States is:

1. A curve tracer of two variables respectively represented on an axis of Y and an axis of X on a first recording rack, comprising means to move the said first recording rack at a speed depending upon the first of the said variables, a first regulation loop including a first movable organ the removal thereof being regulated by the variations of the second variable, a second regulation loop comprising a second movable organ permitting to trace a curve on said first recording rack, a scale transformation device mechanically coupled to the first said movable organ and including a second recording rack on which a scale transformation curve is traced, representing for each value to be transformed of the second variable, on the axis of X, a transformed value on the axis of Y, and detector means mounted in the second regulation loop and adapted to be movable along the axis of Y of the curve of the second recording rack, the removals of the second movable organ being regulated by the removals of the said detector means.

2. A curve tracer, as set forth in claim 1, in which the scale transformation device is a rotatably mounted cylinder.

3. A curve tracer, as set forth in claim 2, in which the cylinder is coupled to a slider of a coiled linear potentiometer.

4. A curve tracer, as set forth in claim 3 in which the potentiometer, the slider and the cylinder are drivingly connected to a motor-reducer, wherein the direction and speed of rotation thereof depend upon the variation of the second variable.

5. A curve tracer as set forth in claim 1, in which the detector means are of photo-electric structure.

6. A curve tracer as set forth in claim 5, in which the detector means comprise a luminous source and a set of two prisms constructed and adapted to be movable in relation to said second recording rack and a set of two photosensitive elements respectively associated to the two prisms, the mounting being such that said luminous source projects light on the said second recording rack and that the light, reflected by the latter, is sent back by the prisms on the photosensitive elements.

7. A curve tracer as set forth in claim 6, in which each of the prisms show in profile a right triangle the apexes of the triangles being joined, one of the sides adjacent the right angle of one of the triangles being aligned with the corresponding side of the other triangle, said sides being adjacent the second recording rack.

8. A curve tracer, as set forth in claim 7, in which the prisms have a right triangular cross-section, their apexes being aligned, the photo-sensitive elements being adjacent the respective faces of the prisms, opposed to their top edges.

9. A curve tracer as set forth in claim 7, in which the prisms are pyramidal having square bases, each prism side face adjacent to the second recording rack being perpendicular to its base, the apexes being joined, the photosensitive elements being respectively adjacent to each prism base.

10. A curve tracer as set forth in claim 7, in which the triangle sides adjacent to the second recording rack are parallel to the plane going through a generatrix of the cylinder.

11. A curve tracer as set forth in claim 6, in which the photosensitive elements are photoresistances.

12. A curve tracer as set forth in claim 11, in which the photoresistances are arranged in series with the terminals of a voltage source, their junction point having a differential signal which forms the variation signal of the regulation loop.

13. A curve tracer as set forth in claim 2 in which the first recording rack is mounted on a plate movable in a direction which is perpendicular to the cylinder axis and driven by a motor.

14. A curve tracer as set forth in claim 13, in which the motor is a "Step by step" device.

* * * * *

PO-1050
(5/69)

UNITED STATES PATENT OFFICE
CERTIFICATE OF CORRECTION

Patent No. 3,700,992                Dated October 24, 1972

Inventor(s) JACQUES A. PONTIGNY

It is certified that error appears in the above-identified patent and that said Letters Patent are hereby corrected as shown below:

Column 3, line 38, after "means" insert --on the shaft 8 of the motor-reducer 7 as well as with fastening means--.

Signed and sealed this 15th day of May 1973.

(SEAL)
Attest:

EDWARD M. FLETCHER, JR.
Attesting Officer

ROBERT GOTTSCHALK
Commissioner of Patents